United States Patent
Xue et al.

(10) Patent No.: US 9,155,125 B1
(45) Date of Patent: *Oct. 6, 2015

(54) LOCATION VALIDATION SYSTEM AND METHODS

(75) Inventors: Wen Xue, Overland Park, KS (US); Arun Santharam, Atlanta, GA (US); Douglas R. Green, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 817 days.

This patent is subject to a terminal disclaimer.

(21) Appl. No.: 12/560,859

(22) Filed: Sep. 16, 2009

(51) Int. Cl.
*H04W 24/00* (2009.01)
*H04W 88/06* (2009.01)
*H04W 8/18* (2009.01)

(52) U.S. Cl.
CPC .............. *H04W 88/06* (2013.01); *H04W 8/18* (2013.01); *H04W 24/00* (2013.01)

(58) Field of Classification Search
CPC ....... H04W 12/06; H04W 4/02; H04W 64/00; H04W 4/021; H04W 4/206; H04W 84/045; H04W 88/06; H04W 48/18; H04W 76/02; H04W 48/16; H04L 43/0876; H04L 12/5692; H04M 1/72527; H04M 1/0256; H04M 1/21
USPC ............... 455/424, 414.1, 187.1, 456.1, 418, 455/452.2, 455, 435.2, 461, 456.6, 517, 455/422.1, 404.1, 522, 405, 438, 450, 458, 455/456.5, 457, 436; 370/342, 328; 709/238, 228, 229
See application file for complete search history.

(56) References Cited

U.S. PATENT DOCUMENTS

| | | | |
|---|---|---|---|
| 5,663,734 A | 9/1997 | Krasner | |
| 6,477,363 B1 | 11/2002 | Ayoub et al. | |
| 6,799,052 B2 | 9/2004 | Allegrezza et al. | |
| 6,832,092 B1 * | 12/2004 | Baradello et al. | 455/456.1 |
| 7,885,222 B2 * | 2/2011 | Cole | 370/328 |
| 8,068,534 B2 * | 11/2011 | Levin et al. | 375/147 |
| 8,195,817 B2 | 6/2012 | Xue et al. | |
| 2001/0055392 A1 | 12/2001 | McDonnell et al. | |
| 2003/0217137 A1 | 11/2003 | Roese et al. | |
| 2003/0220835 A1 * | 11/2003 | Barnes, Jr. | 705/14 |
| 2005/0136949 A1 * | 6/2005 | Barnes, Jr. | 455/461 |
| 2005/0249223 A1 * | 11/2005 | Mahendran et al. | 370/395.54 |
| 2006/0035647 A1 * | 2/2006 | Eisner et al. | 455/456.1 |
| 2006/0045267 A1 * | 3/2006 | Moore et al. | 380/247 |
| 2006/0111149 A1 * | 5/2006 | Chitrapu et al. | 455/562.1 |
| 2006/0166655 A1 * | 7/2006 | Montemer | 455/414.1 |
| 2006/0277312 A1 * | 12/2006 | Hirsch | 709/229 |
| 2007/0032247 A1 * | 2/2007 | Shaffer et al. | 455/456.1 |

(Continued)

FOREIGN PATENT DOCUMENTS

WO    WO 2008/044031 A1 *  4/2008  ............. G06Q 50/00

OTHER PUBLICATIONS

USPTO Office Action Summary mailed Nov. 15, 2010 from U.S. Appl. No. 12/369,293.

*Primary Examiner* — Joseph Arevalo (57) ABSTRACT

A location validation system comprising a communication interface configured to receive an asserted location of a wireless communication device and a processing system configured to determine a trusted location of the wireless communication device, receive the asserted location from the communication interface, compare the asserted location to the trusted location, and generate a notification if the asserted location differs from the trusted location.

13 Claims, 5 Drawing Sheets

(56) References Cited

U.S. PATENT DOCUMENTS

| | | | |
|---|---|---|---|
| 2008/0011841 A1* | 1/2008 | Self et al. | 235/385 |
| 2008/0080412 A1* | 4/2008 | Cole et al. | 370/328 |
| 2008/0080457 A1* | 4/2008 | Cole | 370/342 |
| 2008/0080458 A1* | 4/2008 | Cole | 370/342 |
| 2008/0081580 A1* | 4/2008 | Cole | 455/187.1 |
| 2008/0081597 A1* | 4/2008 | Cole | 455/414.1 |
| 2008/0081605 A1* | 4/2008 | Cole | 455/424 |
| 2008/0081606 A1* | 4/2008 | Cole | 455/424 |
| 2008/0096529 A1 | 4/2008 | Zellner | |
| 2008/0208758 A1* | 8/2008 | Spiker et al. | 705/70 |
| 2008/0274752 A1* | 11/2008 | Houri | 455/456.1 |
| 2009/0061870 A1* | 3/2009 | Finkelstein et al. | 455/435.2 |
| 2009/0065578 A1* | 3/2009 | Peterson et al. | 235/382 |
| 2009/0119190 A1* | 5/2009 | Realini | 705/30 |
| 2009/0253442 A1* | 10/2009 | Borrillo et al. | 455/457 |
| 2009/0327151 A1* | 12/2009 | Carlson et al. | 705/80 |
| 2010/0144331 A1* | 6/2010 | Koberg et al. | 455/418 |
| 2010/0145784 A1* | 6/2010 | Sriver et al. | 705/14.25 |
| 2010/0159957 A1* | 6/2010 | Dando et al. | 455/456.5 |
| 2010/0180039 A1* | 7/2010 | Oh et al. | 709/228 |
| 2010/0189887 A1* | 7/2010 | Nielsen et al. | 427/136 |
| 2010/0284442 A1* | 11/2010 | Levin et al. | 375/147 |

* cited by examiner

FIGURE 5

LOCATION VALIDATION SYSTEM AND METHODS

TECHNICAL BACKGROUND

As technology has developed, the functionality available in wireless communication devices has increased dramatically. Many wireless communication devices and systems now have integrated location determination capabilities which allow system operators to determine the physical location of users who place 911 emergency calls.

In addition to being useful for emergency calls, other applications can benefit from the widespread implementation of location determination capabilities. Law enforcement can use the capabilities to identify the location of a person of interest. In commercial environments, vendors may be required to verify that customers making certain types of purchases are either inside or outside specific regions. The continuing migration to ecommerce means fewer transactions take place face-to-face and vendors may have a need to verify the physical location of their customers, particularly when the purchase involves electronic goods.

In order to circumvent these uses of location determination features, users may be motivated to cause their wireless communication device to incorrectly report location information. In addition, some system operators and service providers may simply want an efficient means of validating a user's location in order to facilitate the offering of location based services. Consequently, system operators, vendors, law enforcement, and others have a need to validate the location being reported by a user's wireless communication device.

OVERVIEW

In various embodiments, systems and methods are provided to validate the location of a wireless communication device. In an embodiment, a location validation system comprises a communication interface configured to receive an asserted location of a wireless communication device and a processing system configured to determine a trusted location of the wireless communication device. The processing system receives the asserted location from the communication interface, compares the asserted location to the trusted location, and generates a notification if the asserted location differs from the trusted location.

In another embodiment, a method of operating a location validation system comprises receiving an asserted location of a wireless communication device through a communication interface, determining a trusted location of the wireless communication device, and comparing the asserted location to the trusted location. If the asserted location differs from the trusted location, a notification is generated.

DETAILED DESCRIPTION

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
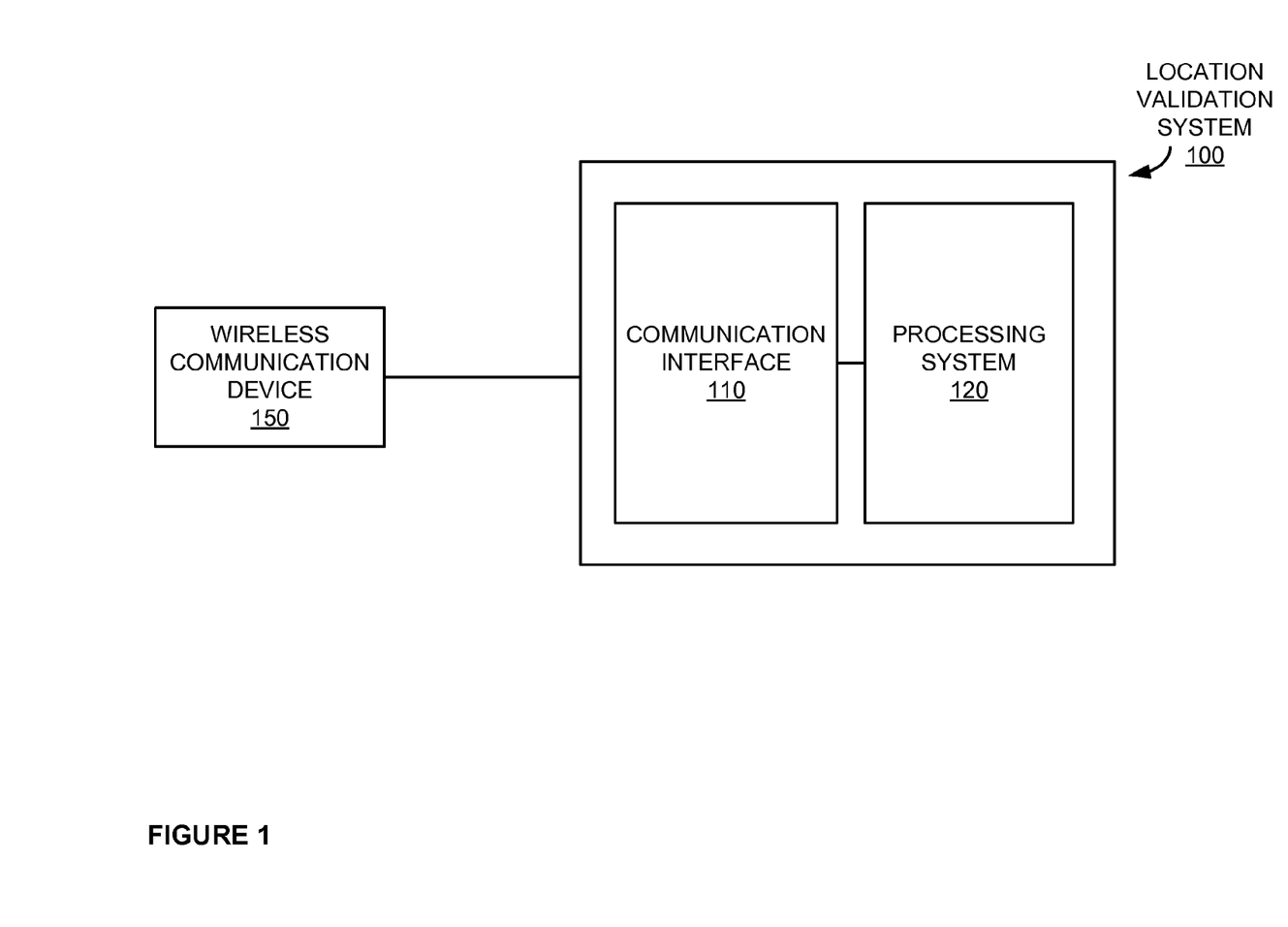
FIG. 1 illustrates a location validation system.

FIG. 1 illustrates location validation system 100. Location validation system 100 includes communication interface 110 and processing system 120. Wireless communication device (WCD) 150 communicates with location validation system 100 over a communication link. Communication interface 110 is able to receive location information from WCD 150 and provide that location information to processing system 120. Processing system 120 performs a validation process in which the received location information is compared to location information from other sources. It is understood that there may be other devices, systems, or components which make up or utilize the communication link between WCD 150 and location validation system 100.

Figure 2:
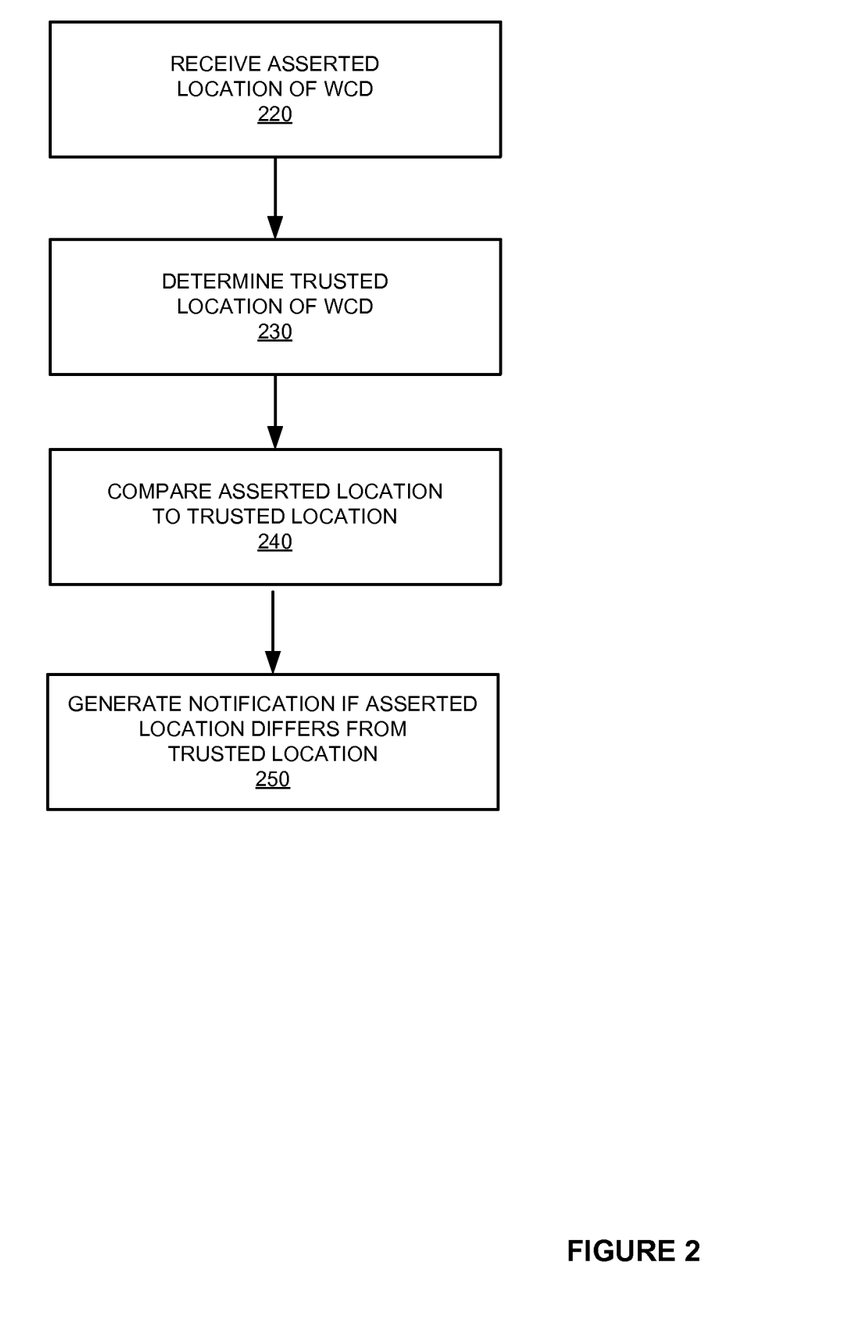
FIG. 2 illustrates the operation of a location validation system.

FIG. 2 illustrates the operation of location validation system 100. Communication interface 110 receives a communication including the asserted location of WCD (Step 220). An asserted location is a location which is determined based primarily upon information provided by WCD 150 or by the user of WCD 150. Until validated, the location is treated as asserted because it is user provided and it is not known whether it can be relied upon.

Continuing with FIG. 2, processing system 120 then determines a trusted location for WCD 150 (Step 230). A trusted location is a location determined based primarily upon information which is presently available from sources other than WCD 150 or the user of WCD 150. A trusted location may be determined based upon information which was provided by WCD 150 or the user of WCD 150 prior to the current communication session and is now available from other sources. Processing system 120 then performs a validation process comparing the asserted location to the trusted location (Step 240). If processing system 120 determines that the asserted location differs from the trusted location, a notification is generated (Step 250).

Referring back to FIG. 1, communication interface 110 comprises a device or collection of devices capable of receiving an asserted location of a wireless communication device. These devices are typically comprised of communication circuitry or communication components. Typical examples are network cards, base stations, ports, routers, access equipment, or other types of network communication devices. Communication interface 110 may include features which serve purposes other than the needs of location validation system 100. Communication interface 110 may be distributed across multiple devices or locations.

Processing system 120 comprises a device or collection of devices capable of determining a trusted location of a wireless communication device, receiving the asserted location from communication interface 110, comparing the asserted location to the trusted location, and generating a notification if the two differ. The devices comprising processing system 120 typically include processing circuitry and other processing components. Typical examples are microprocessors, integrated circuits, application specific integrated circuits, base station controllers, mobile switching centers, call processing systems, computers, servers, or other types of processing systems. Processing system 120 may interface to and provide services for multiple communication interface elements. Processing system 120 may reside in a single device or may be distributed across multiple devices or locations.

WCD 150 comprises RF communication circuitry and an antenna. The RF communication circuitry typically includes an amplifier, filter, modulator, and signal processing circuitry. WCD 150 may also include a user interface, memory device, software, processing circuitry, or other communication components. WCD 150 may be a telephone, computer, e-book, mobile Internet appliance, wireless network interface card, media player, game console, or some other wireless communication apparatus, including combinations thereof.

Figure 3:
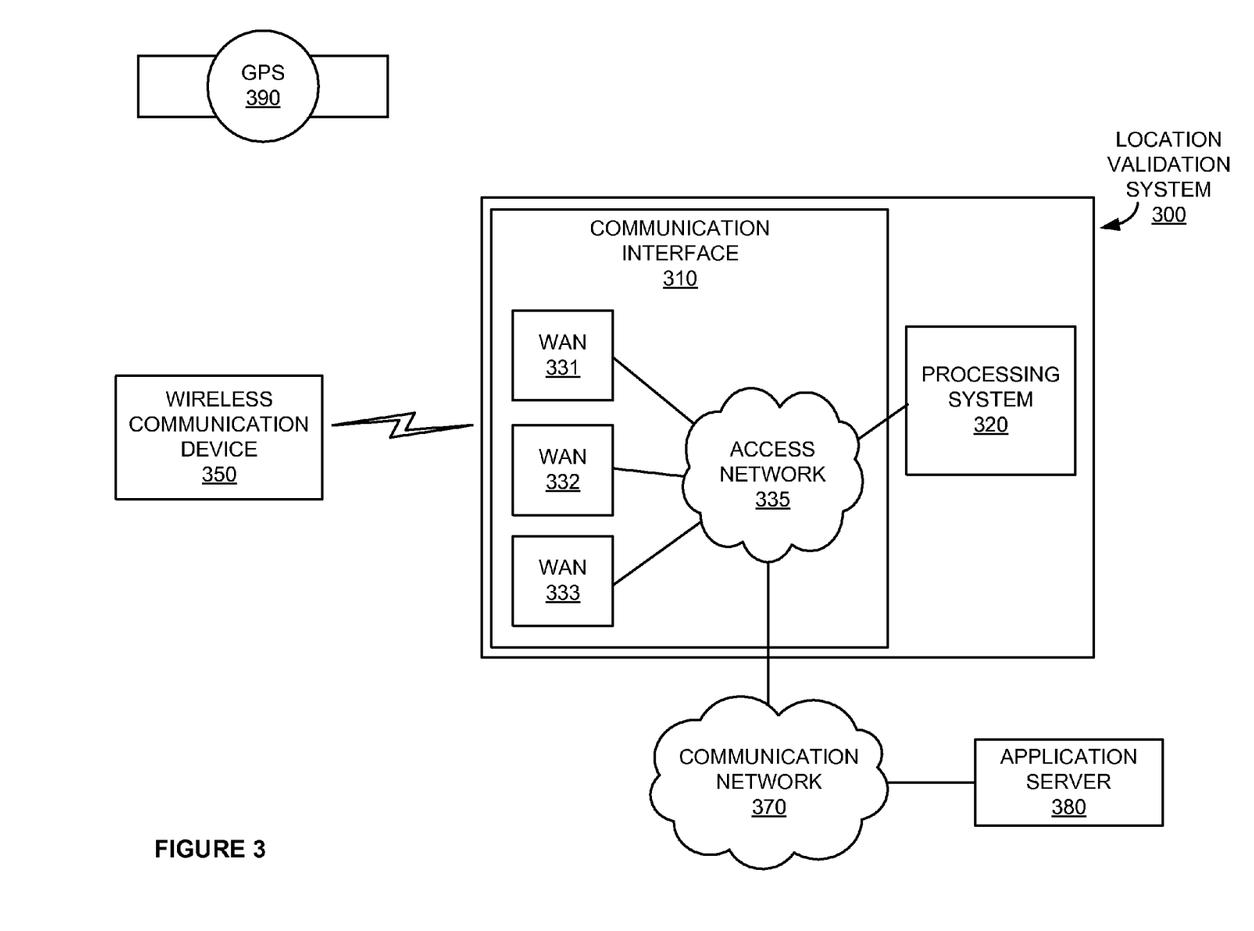
FIG. 3 illustrates a location validation system.

FIG. 3 illustrates location validation system 300. Location validation system 300 comprises communication interface 310 and processing system 320. Communication interface 310 and processing system 320 are operatively connected by a communication link. Communication interface 310 comprises access network 335 and wireless access nodes (WANs) 331-333. Among other functions, access network 335 provides the interface and control functions necessary to allow processing system 320, communication network 370, and WANs 331-333 to communicate with each other.

WCD 350 is capable of establishing communication with location validation system 300 through communication interface 310. WCD 350 is also capable of receiving signals from global positioning system (GPS) 390. GPS 390 is a constellation of satellites transmitting global position signals which allow WCD 350 to calculate its own physical location. Even though only one satellite is shown in FIG. 3, it is understood that GPS 390 may include many satellites which each transmit signals which can be used by receiving devices.

Access network 335 comprises a communication system or collection of communication systems capable of communicating with WANs 331-333, processing system 320, and communication network 370. For example, access network 335 may include routers, communication links, servers, authentication systems, or other network devices.

WANs 331-333 comprise call processing elements necessary to receive RF communications, including location information, from wireless devices. The call processing elements typically include RF communication circuitry which may include amplifiers, antennas, filters, RF modulators, cabling, signal processing circuitry, and other communications components. WANs 331-333 may also include a computer, router, server, memory device, software, processing circuitry, power supply, structural support, network communication interface, or some other communication apparatus. Typical examples of a WAN may include cellular base stations, wireless routers, or other wireless communication access points. WANs 331-333 may reside in a single device or may be distributed across multiple devices or locations.

Each of communication interface 310, access network 335, and WANs 331-333 may include features which serve purposes other than the needs of location validation system 300.

Processing system 320 comprises a device or collection of devices capable of determining a trusted location of a wireless communication device, receiving an asserted location from communication interface 310, comparing the asserted location to the trusted location, and generating a notification if the two differ. The devices comprising processing system 320 typically include processing circuitry and other processing components. Typical examples are base station controllers, mobile switching centers, call processing systems, computers, servers, or other types of processing systems. Processing system 320 may interface to and provide services for multiple communication interface elements. Processing system 320 may reside in a single device or may be distributed across multiple devices or locations.

WCD 350 comprises RF communication circuitry and an antenna. The RF communication circuitry typically includes an amplifier, filter, modulator, and signal processing circuitry. WCD 350 may also include a user interface, memory device, software, processing circuitry, or other communication components. WCD 350 may be a telephone, computer, e-book, mobile Internet appliance, wireless network interface card, media player, game console, or some other wireless communication apparatus, including combinations thereof. WCD 350 is capable of receiving signals from GPS 390 and calculating its own location based on those signals.

Communication network 370 is any network or collection of networks, such as a wireless communication network, a public switched telephone network, an intranet, or an internet.

Application server 380 comprises a device or collection of devices capable of providing information in response to requests from other devices. The devices which make up application server 380 typically include processing circuitry and a data storage system. Typical examples of the processing circuitry are computers, servers, microprocessors, or other types of processing devices. Typical examples of the data storage system are disk drives, tape drives, flash memory, random access memory, or other types of data storage devices. Application server 380 may interface to and provide service to multiple networks. Application server 380 may reside in a single device or may be distributed across multiple devices or locations.

Figure 4:
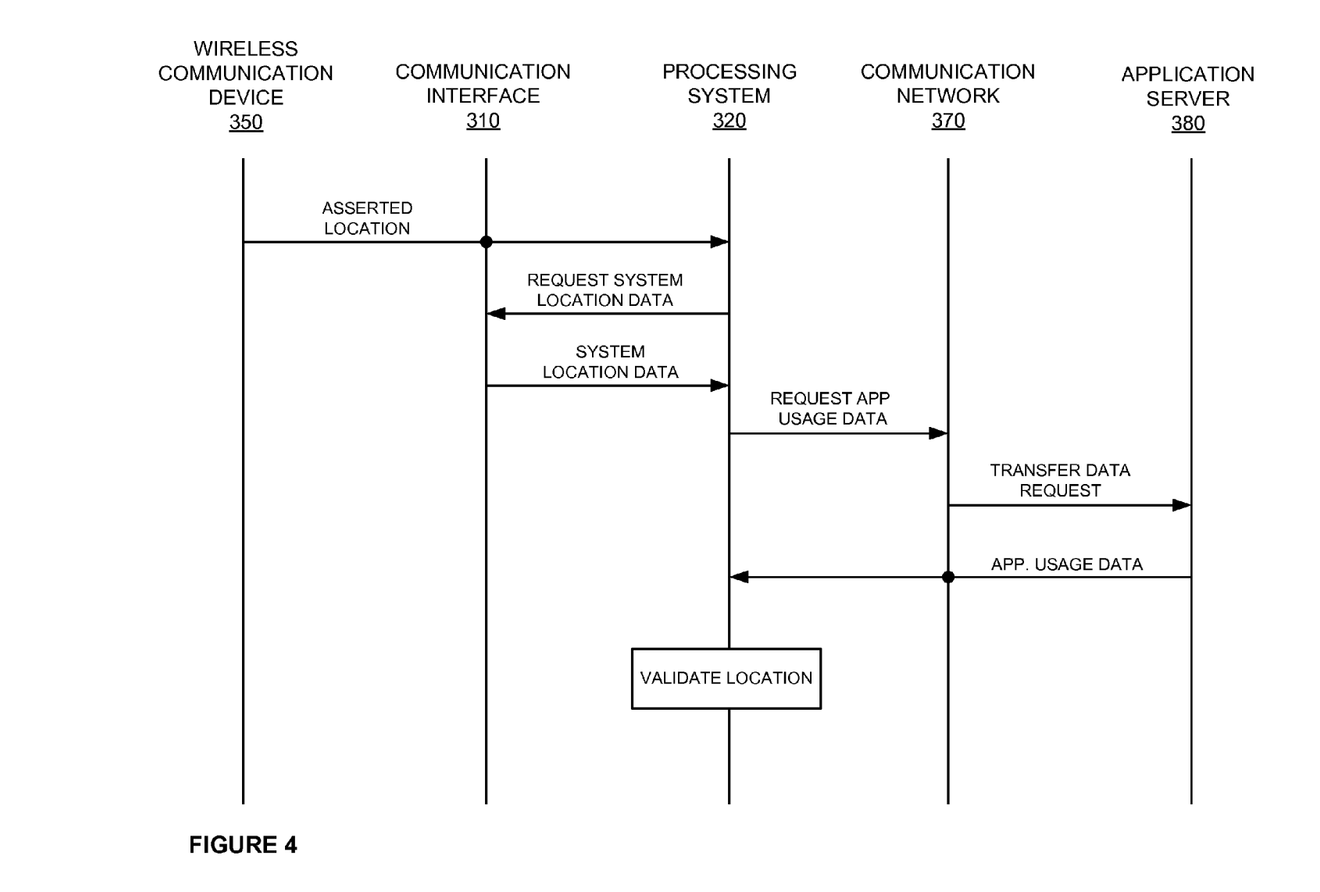
FIG. 4 illustrates the operation of a location validation system.

FIG. 4 illustrates one example of the operation of location validation system 300. WCD 350 provides information indicating an asserted location. Processing system 320 is configured to receive the asserted location of WCD 350 through communication interface 310. The asserted location may be based on computations from signals received from GPS 390 or it may be based on information supplied by a user of WCD 350. In an example, the user of WCD 350 may enter the asserted location into WCD 350 by entering a zip code. Furthermore, the asserted location may be based upon information which has been intentionally falsified or spoofed. The information may be made to appear as if it was determined using GPS 390 when in fact it was artificially generated and gives the appearance that the device is in another location. Because the false location information may be designed to impersonate location information legitimately determined based upon GPS 390 signals, it may be difficult to distinguish between the two without using other sources of information. A user may be motivated to cause a wireless communication device to behave in this manner in order to be able to continue using the device while attempting to not reveal his physical location.

Continuing with FIG. 4, processing system 320 then determines a trusted location of WCD 350. There are multiple ways processing system 320 may determine the trusted location of WCD 350. Assuming for the purposes of this example that WCD 350 is in communication with WAN 332, the trusted location may be determined based upon the known location of the antenna for the WAN 332 which is receiving the communications from WCD 350. The system operator knows the physical location of each of the WANs and the approximate area served by each. By determining which WAN is being used for a particular call, the system operator can determine a region which the user must be within.

The trusted location may be also determined by analyzing the characteristics or timing of the signals transmitted between WCD 350 and WAN 332. The communications between WCD 350 and WAN 332 may also be monitored by WAN 331 and WAN 333 to further determine the trusted location through triangulation or other similar methods. Alternate methods of determining a trusted location involve a combination of the GPS methods described previously with the WAN signal analysis methods described above. Those skilled in the art will appreciate the many methods and hybrids of those methods by which this physical location determination may be accomplished. Communication interface 310 facilitates the process by providing information from one or more of these sources to processing system 320 to allow the trusted location determination to be made based on physical location parameters.

There are also other methods processing system 320 may use to determine the trusted location of WCD 350 in addition to or in place of the methods described above. Processing system 320 may determine the trusted location by receiving application usage data from application server 380 through communication network 370. For example, usage data may include information such as patterns of requests from application server 380 for location specific information. Analyzing a historical pattern of information requests for this type of location specific information may provide an indication of the physical location of that user. Examples of location specific information are weather conditions or movie times for a particular city. Application server 380 may be a service provided by the system operator thereby making the information easier to obtain and avoiding the need to search through all information queries or internet traffic for that user.

Processing system 320 then compares the asserted location to the trusted location information, and generates a notification if the asserted location differs from the trusted location. It is understood that the different methods of determining location each have inherently different levels of accuracy and resolution and the process of determining whether two locations differ may involve taking those differing levels of accuracy and resolution into account.

Figure 5:
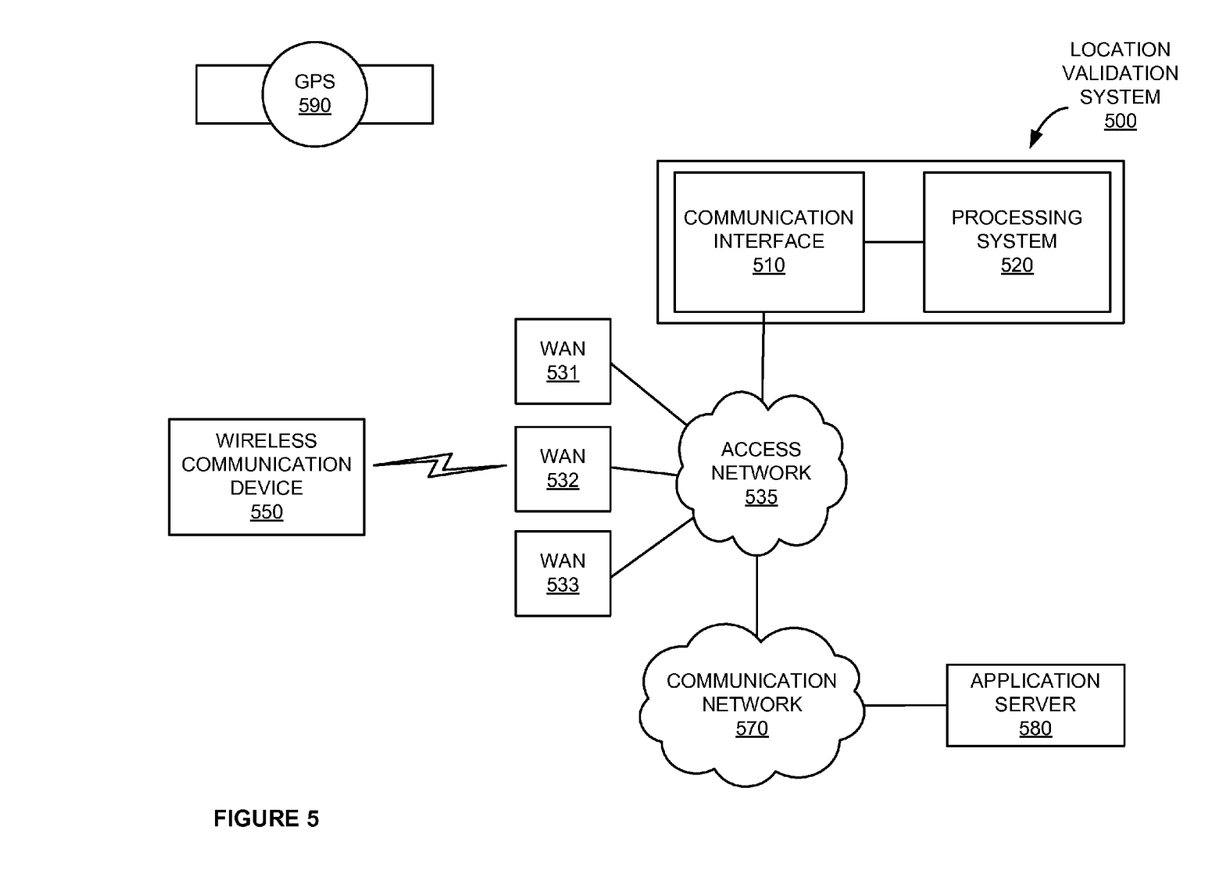
FIG. 5 illustrates a location validation system.

FIG. 5 illustrates location validation system 500. Location validation system 500 comprises communication interface 510 and processing system 520. Communication interface 510 and processing system 520 are operatively connected by a communication link.

WCD 550 is capable of establishing communication with location validation system 500 through WANs 531-533 and access network 535. WCD 550 is also capable of receiving signals from GPS 590. GPS 590 is a constellation of satellites transmitting global position signals which allow WCD 550 to calculate its physical location. Even though only one satellite is shown in FIG. 5, it is understood that GPS 590 may include many satellites which each transmit signals which can be used by receiving devices.

Processing system 520 comprises a device or collection of devices capable of determining a trusted location of a wireless communication device, receiving an asserted location from communication interface 510, comparing the asserted location to the trusted location, and generating a notification if the two differ. The devices comprising processing system 520 typically include processing circuitry and other processing components. Typical examples are microprocessors, integrated circuits, and application specific integrated circuits. Processing system 520 may interface to and provide services for multiple communication interface elements. Processing system 520 may reside in a single device or may be distributed across multiple devices or locations.

Communication interface 510 comprises a device or collection of devices capable of receiving an asserted location of a wireless communication device from access network 535. The devices making up communication interface 510 are typically comprised of communication circuitry or communication components. Typical examples are network cards, ports, routers, or other types of network communication devices. Communication interface 510 may reside in a single device or may be distributed across multiple devices or locations.

Access network 535 comprises a communication system or collection of communication systems capable of communicating with WANs 531-533, communication network 570, and communication interface 510. For example, access network 535 may include routers, communication links, servers, software, authentication systems, or other network devices. Access network 535 may reside in a single device or may be distributed across multiple devices or locations.

WANs 531-533 comprise a computer and other call processing elements necessary to receive communications, including location information, from wireless devices. The call processing elements typically include RF communication circuitry which may include amplifiers, antennas, filters, RF modulators, cabling, signal processing circuitry, and other communications components. WANs 531-533 may also include a computer, router, server, memory device, software, processing circuitry, power supply, structural support, network communication interface, or some other communication apparatus. Typical examples of a WAN may include cellular base stations, wireless routers, mesh network components, Digital Living Network Alliance (DLNA) enabled devices, or other wireless communication access points. WANs 531-533 may reside in a single device or may be distributed across multiple devices or locations.

WCD 550 comprises RF communication circuitry and an antenna. The RF communication circuitry typically includes an amplifier, filter, modulator, and signal processing circuitry. WCD 550 may also include a user interface, memory device, software, processing circuitry, or other communication components. WCD 550 may be a telephone, computer, e-book, mobile Internet appliance, wireless network interface card, media player, game console, or some other wireless communication apparatus, including combinations thereof. WCD 550 is capable of receiving signals from GPS 590 and calculating its own location based on those signals.

Communication network 570 is any network or collection of networks, such as a wireless communication network, a public switched telephone network, an intranet, or an internet.

Application server 580 comprises a device or collection of devices capable of providing information in response to requests from other devices. The devices making up application server 580 typically include processing circuitry and a data storage system. Typical examples of the processing circuitry are computers, servers, microprocessors, or other types of processing devices. Typical examples of the data storage system are disk drives, tape drives, flash memory, random access memory, or other types of data storage devices. Application server 580 may interface to and provide service to multiple networks. Application server 580 may reside in a single device or may be distributed across multiple devices or locations.

In one example of the operation of location validation system 500, WCD 550 provides information indicating an asserted location. Processing system 520 is configured to receive the asserted location of WCD 550 through communication interface 510. The asserted location provided by WCD 550 may be based on computations from signals received from GPS 590 or it may be based on information supplied by a user of WCD 550. Furthermore, the asserted location may be based upon information which has been intentionally falsified or spoofed. The information may be made to appear as if it was determined using GPS 590 when in fact it was artificially generated and gives the appearance that the device is in another location. Because the false location information may be designed to impersonate location information legitimately determined based upon GPS 590 signals, it may be difficult to distinguish between the two without using other sources of information. A user may be motivated to cause a wireless communication device to behave in this manner in order to be able to continue using the device while attempting to not reveal his physical location.

Processing system 520 then determines a trusted location of WCD 550. There are multiple ways processing system 520 may determine the trusted location of WCD 550. Assuming for the purposes of this example that WCD 550 is communication with WAN 532, the trusted location may be determined based upon the known location of the antenna for the WAN 532 which is receiving the communications from WCD 550. The system operator knows the physical location of each of the WANs and the approximate area served by each. By determining which WAN is being used for a particular call, the system operator can determine a region which the user must be within.

The trusted location may be also determined by analyzing the characteristics or timing of the signals transmitted between WCD 550 and WAN 532. The communications between WCD 550 and WAN 532 may also be monitored by WAN 531 and WAN 533 to further determine the trusted location through triangulation or other similar methods. Alternate methods of determining a trusted location involve a combination of the GPS methods described previously with the WAN signal analysis methods described above. Those skilled in the art will appreciate the many methods and hybrids of those methods by which this physical location determination may be accomplished. Communication interface 510 provides the trusted location information, determined using one or more of these methods, to processing system 520.

There are also other methods processing system 520 may use to determine the trusted location of WCD 550 in addition to or in place of the methods described above. Processing system 520 may determine the trusted location by receiving application usage data from application server 580 through communication network 570. For example, usage data may include information such as patterns of requests from application server 580 for location specific information. Analyzing a historical pattern of information requests for this type of location specific information may provide an indication of the physical location of that user. Examples of the location specific information are weather conditions or movie times for a particular city. Application server 580 may be a service provided by the system operator thereby making the information easier to obtain and avoiding the need to search through all information queries or internet traffic for that user.

Processing system 520 then compares the asserted location to the trusted location information, and generates a notification if the asserted location differs from the trusted location. It is understood that the different methods of determining location each have inherently different levels of accuracy and resolution and the process of determining whether two locations differ may involve taking those differing levels accuracy and resolution into account.

Location validation system 500 has the advantage that it can be interfaced to an existing wireless communication system comprised of access network 535, communication network 570, and WANs 531-533 without any changes to the existing system architecture. Furthermore, location validation system 500 can be configured in a manner such that it does not interfere with the normal operation of the existing communication system.

In one of many possible applications of location validation system 500, law enforcement could use location validation system 500 to query WCD 550 in order to determine a location for a user of WCD 550. If WCD 550 had been modified in a way which caused it to transmit false location information, location validation system 500 would discover this through the validation process. A similar result would occur if WCD 550 were reporting inaccurate location information due to a malfunction. In an advantage, law enforcement could be notified that WCD 550 was reporting incorrect location information before any further action was taken.

In one possible commercial application, vendors could use location validation system 500 to verify the location of buyers making purchases using wireless communication devices in order to determine whether exemption from state or local sales taxes was appropriate.

In another possible use, system operators could use location validation system 500 to test the location determination capabilities of WCD 550 as a safety measure to insure the features were working correctly prior to needing them for an emergency call. All of the examples provided serve only to illustrate possible uses of location validation system 500 and those skilled in the art will appreciate that many other uses of the invention are possible.

In one possible application of the invention, the user of a wireless communication device may be evading law enforcement authorities and may wish to conceal his physical location while still making use of his wireless communication device. Knowing the device has GPS or other features which can determine and communicate the physical location of the device, the user modifies the device or downloads software causing it to falsely report physical location information. Without the use of the invention provided here, law enforcement would waste time, effort, and resources attempting to find the user at the asserted location provided by the device. Even if the device was reporting an incorrect location due to an innocent malfunction, authorities would still be led to the wrong location.

In either situation, the efforts of law enforcement are aided by using trusted location information to validate the location asserted by the device. The system operator will receive notification that the asserted location provided by the device does not match the trusted location determined from other sources of information. The trusted location might be determined based upon system operational characteristics or it might be determined based upon the types of information the user has been accessing. In either case, the system operator will be notified that the trusted location is a more reliable determination of the user's location and this information can be provided to law enforcement in order to make their efforts more efficient and effective.

In another example of the use of the invention claimed here, a vendor may be required to verify the location of a purchaser before a sale can be completed. While the delivery address for the goods is often satisfactory in transactions which require some sort of location verification, the problem becomes much more challenging when the goods involved are electronic and are delivered electronically. Some states have experimented with the idea of selling lottery tickets in electronic form. However, many states also have requirements that lottery ticket purchases can only be made within the state or on certain, licensed premises. As a result, the vendor may have a need to verify that the purchaser is within a certain region or boundaries before lottery tickets may be sold to that person.

Users who are purchasing lottery tickets using a wireless, mobile device may be motivated to have their location falsely reported in order to make them eligible to purchase lottery tickets in other jurisdictions. A user may falsely report their location by modifying their device to do so or simply entering a false response when queried about their physical location. With the assistance of system operators, vendors can utilize the invention disclosed here to give them notification that the location being asserted by a user or device does not match the trusted location for the device. This may disqualify the buyer altogether or may simply trigger a more extensive inquiry into the circumstances of the purchase. In either case, it provides the vendor a better means of complying with the applicable rules or regulations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A location validation system to validate an asserted location of a wireless communication device to a vendor for an electronic purchase, the location validation system comprising:
   a communication interface configured to wirelessly receive the asserted location of the wireless communication device from the wireless communication device for the electronic purchase from the vendor, wherein the asserted location comprises a location of the wireless communication device determined from a zip code entered by a user of the wireless communication device;
   a processing system configured to receive the asserted location from the communication interface, after receiving the asserted location from the communication interface, determine a trusted location of the wireless communication device based on wireless signals from the wireless communication device to a wireless access network, compare the asserted location to the trusted location to verify the asserted location, and notify the vendor if the asserted location differs from the trusted location.

2. The location validation system of claim 1 wherein the trusted location is determined using data transmitted by the wireless communication device prior to the transmission of the asserted location by the wireless communication device.

3. The location validation system of claim 1 wherein the trusted location is determined using data compiled from interactions between the wireless communication device and an application server prior to the transmission of the asserted location by the wireless communication device.

4. The location validation system of claim 1 wherein the trusted location is determined using the location of a base station receiving radio frequency transmissions from the wireless communication device.

5. The location validation system of claim 4 wherein the trusted location is determined by analyzing characteristics of the radio frequency transmissions between the wireless communication device and the base station.

6. The location validation system of claim 5 wherein the trusted location is determined through triangulation.

7. The location validation system of claim 1 wherein the communication interface comprises a plurality of base stations and an access network.

8. A method of operating a location validation system to validate an asserted location of a wireless communication device to a vendor for an electronic purchase, the method comprising:
   wirelessly receiving the asserted location of the wireless communication device from the wireless communication device for the electronic purchase from the vendor, wherein the asserted location comprises a location of the wireless communication device determined from a zip code entered by a user of the wireless communication device;
   after receiving the asserted location, determining a trusted location of the wireless communication device based on wireless signals from the wireless communication device to a wireless access network;
   comparing the asserted location to the trusted location to verify the asserted location; and
   notifying the vendor if the asserted location differs from the trusted location.

9. The method of claim 8 wherein the trusted location is determined using data transmitted by the wireless communication device prior to the transmission of the asserted location by the wireless communication device.

10. The method of claim 8 wherein the trusted location is determined using data compiled from interactions between the wireless communication device and an application server prior to the transmission of the asserted location by the wireless communication device.

11. The method of claim 8 wherein the trusted location is determined using the location of a base station receiving radio frequency transmissions from the wireless communication device.

12. The method of claim 11 wherein the trusted location is determined by analyzing the characteristics of radio frequency transmissions between the wireless communication device and the base station.

13. The method of claim 12 wherein the trusted location is determined through triangulation.

* * * * *